March 17, 1931.    P. A. WICKES ET AL    1,797,064
LOG TRANSPORTING VEHICLE
Filed May 2, 1927
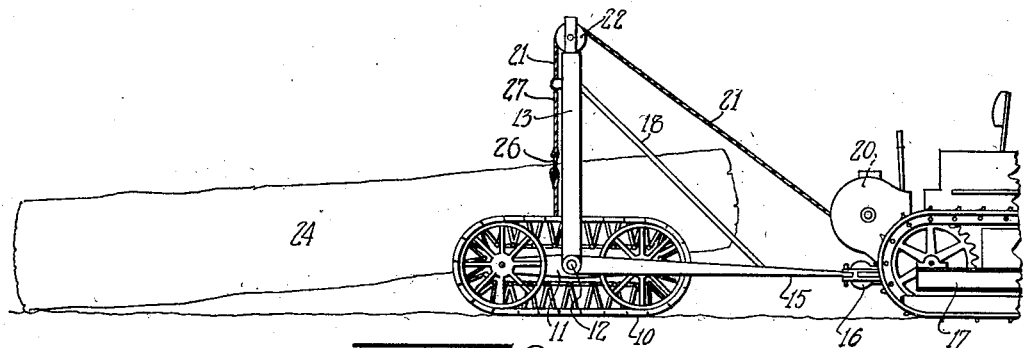
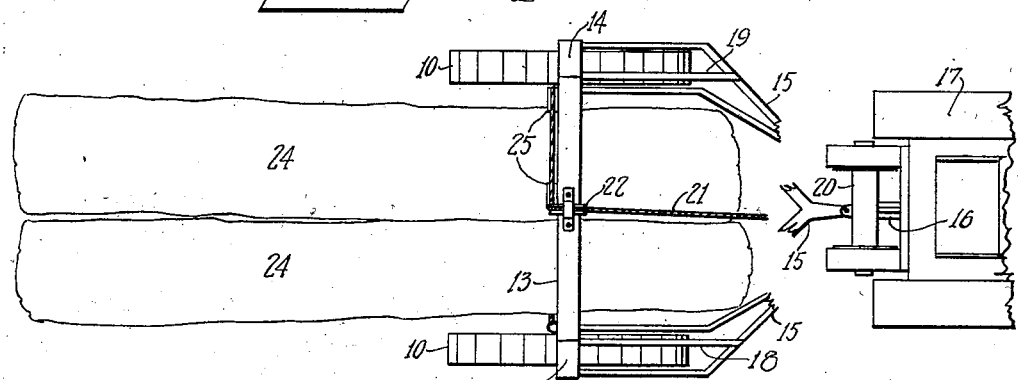
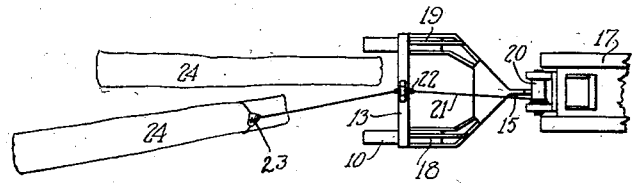
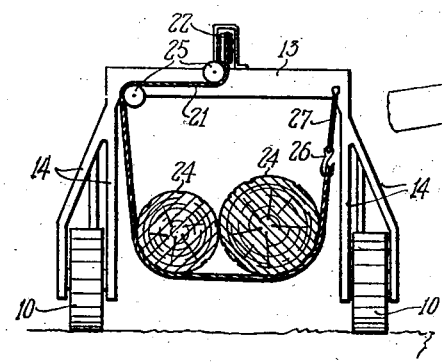
INVENTORS
P. A. Wickes  Geo. Neils
BY E. B. Birkenbeuel.
ATTORNEY Patented Mar. 17, 1931

1,797,064

UNITED STATES PATENT OFFICE

POWERS A. WICKES, OF PORTLAND, OREGON, AND GEORGE NEILS, OF LIBBY, MONTANA

LOG-TRANSPORTING VEHICLE

Application filed May 2, 1927. Serial No. 188,294.

This invention relates generally to the logging industry, and particularly to a special type of log transporting vehicle with special reference to what is known as the high arch type of vehicle in which the load is underslung beneath its frame.

The first object of this invention is to provide a novel form of high arch log transporting vehicle in which the crawler type of ground-engaging element is employed in order that the maximum load-sustaining capacity of the vehicle can be maintained at all times.

The second object is to so construct the vehicle that it readily adapts itself to use with an endless track type of tractor having a single cable drum mounted on the rear thereof, which drum can be employed for bunching purposes or for raising the forward end of the logs clear of the ground.

These, and other objects, will become more apparent from the specification following as illustrated in the accompanying drawing, in which:

Figure 1 is a side elevation of the device showing same attached to a tractor and showing the logs in a position ready for movement. Figure 2 is a plan of Figure 1. Figure 3 is a rear end elevation of the device showing the supported logs cut away in section. Figure 4 is a somewhat diagrammatic plan showing the device used for bunching the logs.

Similar numbers of reference refer to similar parts throughout the several views.

Referring in detail to the drawing, in order to illustrate this invention there is shown a preferred form of ground engaging element 10 which is of the crawler type and has provided at the center of its truck frame 11 a trunnion 12 to which is attached an arched frame 13. The high arch 13 is a massive unit having each of its two vertical side members bifurcated to form forks 14 between which are received the crawler units, the latter being connected pivotally to the lower ends of the high arch thru the alined axes of the trunnions 12 which lie above the ground a distance which is illustrated as being less than one-fourth of the clearance of the bottom of the transverse beam of the arch, thus affording a very low center of gravity for the trailer, particularly since the generally horizontal draft tongue 15 is secured to the high arch at the lower ends of the forks 14, consequently at the approximate center of gravity of the crawler units. The braces 18 and 19 which extend from the draft tongue 15 to the frame 13 to provide the desired rigidity for the device may be parallel as shown to cooperate with the forked rear ends of the draft tongue to protect the crawler units.

While perhaps the trailer structure made up of the high arch frame 13, the draft tongue frame 15 and the two crawler units each connected to the combined frames about a single pivoting axis might be drawn by other means we much prefer the scheme wherein the tongue is very loosely pivoted to the draw bar 16 of the tractor 17 to permit the usual oscillations of the trailer, this connection while thus giving considerable play nevertheless limiting quite sharply the raising and falling of the forward end of the draft tongue frame about its single pivot thru the alined axes of the trunnions 12.

The tractor 17 carries a cable winding drum 20 such as are in common use, and its cable 21 passes over the sheave or roller 22 at the top of the transverse beam-like central portion of the frame 13 and is provided on its end with a choker hook 23 for the purpose of bunching the logs 24, if necessary. In order to raise the forward end of the logs 24 clear of the ground for transportation purposes the cable 21 is passed around the sheaves 25 and then under the logs 24, as shown in Figure 3, and is then held by the hook 26 on the short line 27 which is attached to the frame 13. By this arrangement the purchase of the drum 20 is doubled so that a relatively low power drum is capable of lifting the largest load which would be handled by such devices, sufficiently high for the purpose.

It is, of course, understood that high wheel logging has long been practiced, originally with oxen and horses and finally with the aid of power tractors. Various devices have been utilized for raising the loads clear of the ground, ranging from eccentric connections to hydraulic power lifts such as are now in common use, but maintaining all the while the high and relatively narrow ground-engaging element, namely a wheel whose great height made necessary extremely heavy construction in order to enable same to withstand the enormous loads and shocks to which such devices are subjected.

Of more recent years crawler type wagons have been evolved in which the load was placed on top of the vehicle frame with the crawler element supporting the load and wheel members lending longitudinal stability to the vehicle. While these are vastly superior to the high arched wheel type on account of their increased capacity, they are accompanied by the objectionable necessity of employing special loading devices.

The high wheel high arch vehicles possess certain advantages which are, however, offset by enormous disadvantages. First, in order to secure the desired amount of ground support the wheels must be of tremendous dimensions. Those having a diameter of twelve feet and a face of twelve inches are very common. It is easily seen that such great sizes must be accompanied by a corresponding increase in strength, weight and cost and the objectionable raising of the center of gravity of the vehicle, which detracts greatly from its stability on uneven or soft ground. The large wheel diameter is also occasioned by the necessity of reducing the rolling resistance occasioned by the soft road beds commonly found where such devices are used, and also because of the fact that in turning a corner one of the two wheels remains momentarily stationary and digs a frusto-spherical hole in the light volcanic ash ground, the chordal depth of which varies inversely with the radius of the wheel and the indentation thus made is repeatedly deepened by subsequent trips. With endless track devices, whether power driven or of the idle wheel or crawler type, one track moves forward and the other track moves backward in thus making a turn, consequently making no indentation.

With the device about to be described the crawler type of ground-engaging load drawing element is employed. On it is mounted a cable winding drum for bunching, raising and supporting the forward ends of the logs during transportation, and to the load supporting crawler elements is secured a high arch frame under which the logs are supported by the cable or equivalent mechanism.

By this construction the following advantages are gained over the high wheel high arch vehicle. For a given load and ground condition the draw bar pull is reduced, the stability of the vehicle is greatly improved, the load-supporting capacity is increased to a point equal to the pulling power of the tractor element and the weight and cost of the vehicle is also greatly reduced, while its life is lengthened. We have therefore combined the advantages of the high arch with the advantages of the crawler elements for the purpose of reducing the cost of log transportation.

While a drum-operated cable is illustrated as a means for raising the logs, it must be understood that any equivalent apparatus, such as a hydraulic lift or other mechanism, can be substituted therefor. The invention itself resides principally in the combination of a high arch frame with a crawler type of ground-engaging element with or without any particular kind of log raising and supporting member.

We claim:

1. In a log transporting vehicle, the combination of a tractor with a pair of crawler type of load-supporting elements laterally spaced from each other; an arched frame hinged transversely across said load-supporting elements; means supporting said frame and having a connection at its forward end for coupling same to the tractor; and means operable from the tractor for raising loads on the under side of said arched frame into hauling position relatively to the frame and elements.

2. In a device for bunching and for hauling logs, a laterally positioned high arch, a pair of endless track trucks, each of the ends of said arch being pivotally supported by one of the trucks, a frame extending forwardly of the arch, a tractor articulated with the frame, cable winding means on the tractor, cable guiding means at the top of the arch and cable means secured at one end to the winding mechanism and having log gripping means at its other end whereby upon operation of the winding mechanism on the tractor a log is brought into hauling position with relation to the arch and trucks, while the arch is held by the total weight of the tractor and the trucks.

POWERS A. WICKES.
GEORGE NEILS.